(12) United States Patent
Tsuruta et al.

(10) Patent No.: US 10,563,529 B2
(45) Date of Patent: Feb. 18, 2020

(54) TURBINE AND TURBINE STATOR BLADE

(71) Applicant: Toshiba Energy Systems & Solutions Corporation, Kawasaki-shi (JP)

(72) Inventors: Kazutaka Tsuruta, Yokohama (JP); Iwataro Sato, Hiratsuka (JP); Hideyuki Maeda, Yokohama (JP); Satoru Sekine, Yokohama (JP)

(73) Assignee: Toshiba Energy Systems & Solutions Corporation, Kawasaki-shi (JP)

( * ) Notice: Subject to any disclaimer, the term of this patent is extended or adjusted under 35 U.S.C. 154(b) by 258 days.

(21) Appl. No.: 15/697,680

(22) Filed: Sep. 7, 2017

(65) Prior Publication Data
US 2019/0120070 A1 Apr. 25, 2019

Related U.S. Application Data

(63) Continuation of application No. PCT/JP2016/001469, filed on Mar. 15, 2016.

(51) Int. Cl.
*F01D 9/04* (2006.01)
*F01D 11/00* (2006.01)
(Continued)

(52) U.S. Cl.
CPC ........... *F01D 9/041* (2013.01); *F01D 5/187* (2013.01); *F01D 11/001* (2013.01); *F01D 11/003* (2013.01); *F01D 11/005* (2013.01); *F01D 11/02* (2013.01); *F02C 7/28* (2013.01); *F05D 2220/31* (2013.01); *F05D 2240/12* (2013.01); *F05D 2240/55* (2013.01); *F05D 2240/80* (2013.01);
(Continued)

(58) Field of Classification Search
CPC ...... F01D 9/041; F01D 11/003; F01D 11/001; F01D 11/005; F01D 11/02
See application file for complete search history.

(56) References Cited

U.S. PATENT DOCUMENTS 3,004,700 A 10/1961 Warren
3,300,180 A * 1/1967 Tuttle ..................... F01D 9/041
415/138
(Continued)

FOREIGN PATENT DOCUMENTS

CN 101892870 11/2010
CN 103097668 5/2013
(Continued)

*Primary Examiner* — Woody A Lee, Jr.
(74) *Attorney, Agent, or Firm* — Oblon, McClelland, Maier & Neustadt, L.L.P.

(57) ABSTRACT

According to an embodiment, a turbine comprises: a cylindrical casing; and turbine stator blades arranged in the casing along a circumferential direction. The turbine stator blades each includes: a blade effective part; a coolant flow path through which a coolant flows in the blade effective part to cool the blade effective part; an outer ring sidewall provided on an outer periphery of the blade effective part; an inner ring sidewall provided on an inner periphery of the blade effective part; and a contact part provided at an end part of the inner ring sidewall with at least part thereof being along a flow direction of a working fluid, coming into contact with the inner ring sidewall of the adjacent blade during operation, and separating from the inner ring sidewall of the adjacent blade when the operation is stopped.

5 Claims, 6 Drawing Sheets

(51) Int. Cl.
*F02C 7/28* (2006.01)
*F01D 5/18* (2006.01)
*F01D 11/02* (2006.01)

(52) U.S. Cl.
CPC ...... *F05D 2260/20* (2013.01); *F05D 2260/36* (2013.01)

(56) References Cited

U.S. PATENT DOCUMENTS

| | | | | |
|---|---|---|---|---|
| 3,970,318 | A * | 7/1976 | Tuley | F01D 11/005 |
| | | | | 277/641 |
| 6,183,192 | B1 * | 2/2001 | Tressler | F01D 5/189 |
| | | | | 415/115 |
| 6,217,282 | B1 | 4/2001 | Stanka | |
| 6,425,738 | B1 * | 7/2002 | Shaw | F01D 9/041 |
| | | | | 415/208.1 |
| 9,702,259 | B2 * | 7/2017 | Azalbert | F01D 9/04 |

| | | | |
|---|---|---|---|
| 2005/0249588 | A1 | 11/2005 | Ferra et al. |
| 2010/0232940 | A1 | 9/2010 | Ammann |
| 2013/0149125 | A1 | 6/2013 | Onishi et al. |

FOREIGN PATENT DOCUMENTS

| | | |
|---|---|---|
| EP | 2236763 | 10/2010 |
| EP | 2634374 | 9/2013 |
| GB | 2412702 | 10/2005 |
| JP | 7-233705 | 9/1995 |
| JP | 11-107704 A | 4/1999 |
| JP | 2009-079560 | 4/2009 |
| JP | 2009-203841 | 9/2009 |
| JP | 2010-216473 | 9/2010 |
| JP | 2012-97601 | 5/2012 |
| JP | 2012-237318 | 12/2012 |
| JP | 2013-155812 | 8/2013 |
| KR | 2013-0036346 | 4/2013 |
| WO | 2012/057309 | 5/2012 |

* cited by examiner

TURBINE AND TURBINE STATOR BLADE

CROSS-REFERENCE TO RELATED APPLICATION

This application is a continuation of prior International Application No. PCT/JP2016/001469, filed on Mar. 15, 2016; the entire contents of which are incorporated herein by reference.

FIELD

Embodiments described herein generally relate to a turbine and a turbine stator blade.

BACKGROUND

Needs for a carbon dioxide reduction, resource saving, and the like are promoting efficiency enhancement of power plants. For this purpose, active efforts are being made in gas turbine power plants to increase the temperature and pressure of a working fluid. In accordance with the increase of the temperature and pressure of the working fluid, to cope with an increase of stress by fluid force and a decrease of a material allowable stress due to the high temperature in rotor blades, stator blades, and so on, various attempts are being made also regarding their structures and so on.

In recent gas turbines, a cooling medium is supplied to hollow parts of rotor blades and stator blades with a hollow cooling structure fabricated by precision casting. This prevents the rotor blades and the stator blades from increasing in temperature due to heat transfer from working medium whose temperature and pressure are increased.

In the aforesaid precision casting, a ceramics core in the shape of the hollow cooling structure formed of ceramics is set in a mold, and metal is cast into the mold, and thereafter the residual ceramics core is dissolved and removed with a solution of a strong base, whereby a rotor blade or a stator blade having the hollow cooling structure is fabricated.

In the aforesaid gas turbine, the increase of the temperature and pressure of the working fluid increases stresses in vanes and sidewalls of the stator blades and so on. One method to reduce the stress in the blade is to enlarge an airfoil. Enlarging the airfoil, however, causes an increase of a flow loss of the blade and is not desirable in view of thermal efficiency of the gas turbine.

In a typical gas turbine, the stress is reduced by a grouped blade structure in which a plurality of airfoils are set in one structure. This grouped blade structure, however, is typically employed in an uncooled stage and a rear stage having a simple cooling structure. Reasons for this are a heat stress and manufacturing limit of the precision casting, and a stator blade having a complicated cooling structure has no choice but to have a segment structure in which one airfoil is set in one structure. However, a structure that is not the grouped blade structure is weak against torsional deformation force of the blade, and its airfoil has to be enlarged at the risk of a decrease of thermal efficiency of the gas turbine.

As one method to decrease a stress in a steam turbine, there is known a method to weld an inner ring to a shroud to integrate them at the time of assembling a stator blade. However, a gas turbine stator blade used in a temperature range necessitating the cooling of the stator blade comes to have a temperature variation among their components and parts when it is cooled, and suffers a heat stress and thus is not suitable for the integrated structure.

DETAILED DESCRIPTION

Figure 1:
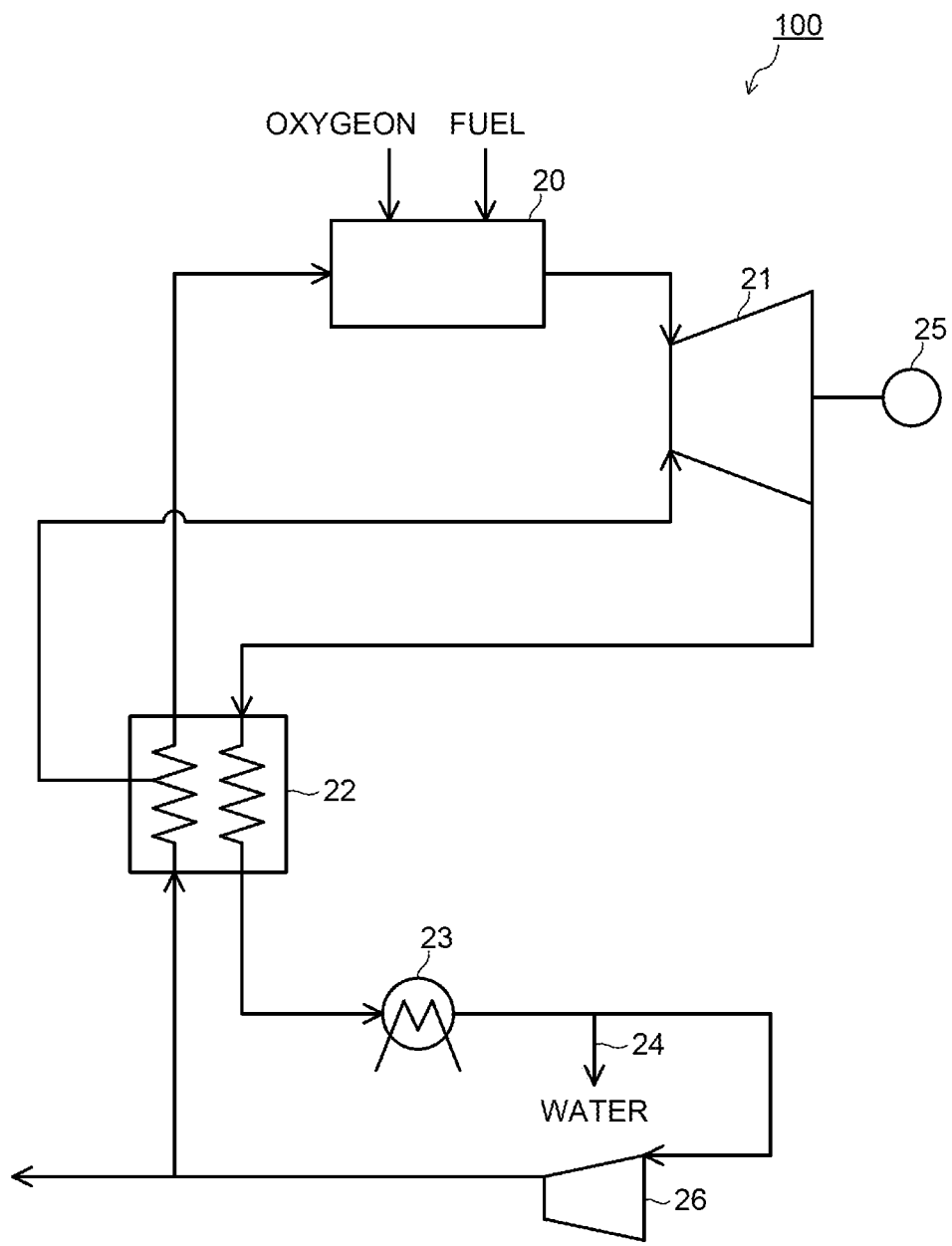
FIG. 1 is a system diagram of a gas turbine facility including a turbine of an embodiment.

A problem to be solved by the present embodiments is to provide a turbine and a turbine stator blade in which a stress can be reduced without enlarging an airfoil or without adopting a grouped blade structure or an integrated structure.

According to an embodiment, there is presented a turbine comprising: a cylindrical casing; and a plurality of turbine stator blades arranged in the casing along a circumferential direction, the turbine stator blades each including: a blade effective part; a coolant flow path through which a coolant flows in the blade effective part to cool the blade effective part; an outer ring sidewall provided on an outer periphery of the blade effective part; an inner ring sidewall provided on an inner periphery of the blade effective part; at least one contact part provided at an end part of the inner ring sidewall with at least part thereof being along a flow direction of a working fluid, coming into contact with the inner ring sidewall of the adjacent blade during operation, and separating from the inner ring sidewall of the adjacent blade when the operation is stopped; at least one labyrinth fin provided on an inner periphery of the inner ring sidewall; at least one protrusion provided on an end part of the inner ring sidewall and protruding toward the inner ring sidewall of the adjacent blade; and at least one recess which is disposed in an end part of the inner ring sidewall so as to face the protrusion of the adjacent blade and in which the protrusion is fit when the contact parts come into contact with each other during the operation.

According to another embodiment, there is presented a turbine stator blade arranged in plurality in a cylindrical casing along a circumferential direction, the turbine stator blade comprising: a blade effective part; a coolant flow path through which a coolant flows in the blade effective part to cool the blade effective part; an outer ring sidewall provided on an outer periphery of the blade effective part; an inner ring sidewall provided on an inner periphery of the blade effective part; a contact part provided at an end part of the inner ring sidewall with at least part thereof being along a flow direction of a working fluid, coming into contact with the inner ring sidewall of the adjacent blade during operation, and separating from the inner ring sidewall of the adjacent blade when the operation is stopped; at least one labyrinth fin provided on an inner periphery of the inner ring sidewall; at least one protrusion provided on an end part of the inner ring sidewall and protruding toward the inner ring sidewall of the adjacent blade; and at least one recess which is disposed in an end part of the inner ring sidewall so as to face the protrusion of the adjacent blade and in which the protrusion is fit when the contact parts come into contact with each other during the operation.

Embodiments of the present invention will be hereinafter described with reference to the drawings.

First Embodiment

FIG. 1 is a system diagram of a gas turbine facility 100 including a turbine of an embodiment. Though FIG. 1 illustrates a case where the present invention is applied to the gas turbine facility 100 using a $CO_2$ turbine, the present invention is applicable not only to the $CO_2$ turbine but also to other gas turbines and steam turbines.

As illustrated in FIG. 1, oxygen and fuel are supplied to a combustor 20 to burn. Carbon dioxide which circulates as a working fluid is also led to the combustor 20. Flow rates of the fuel and the oxygen are adjusted so that their mixture ratio in a completely mixed state becomes a stoichiometric mixture ratio (theoretical mixture ratio), for instance. As the fuel, natural gas, hydrocarbon such as methane, or coal-gasified gas may be used, for instance.

Combustion gas containing carbon dioxide and water vapor, which are generated by the combustion, and the carbon dioxide, which is the working fluid, is discharged from the combustor 20 and is led to a turbine 21. The combustion gas having done an expansion work in the turbine 21 passes through a heat exchanger 22 and further through another heat exchanger 23. When the combustion gas passes through the heat exchanger 23, the vapor condenses into water. The water passes through a pipe 24 to be discharged outside. A generator 25 is coupled to the turbine 21.

The carbon dioxide (dry working gas) separated from the vapor is increased in pressure in a compressor 26 to be a supercritical fluid. At an outlet of the compressor 26, the pressure of the carbon dioxide is about 30 MPa, for instance.

Part of the carbon dioxide increased in pressure in the compressor 26 is heated in the heat exchanger 22 and is supplied as the working fluid to the combustor 20. The carbon dioxide led to the combustor 20 is, for example, jetted from an upstream side of the combustor 20 to a combustion area together with the fuel and an oxidant, or after cooling a combustor liner, is jetted from dilution holes or the like to a downstream side of a combustion area in the combustor liner.

Part of the carbon dioxide being the supercritical fluid is led as a cooling medium to the turbine 21 through a pipe branching off from the middle of a flow path in the heat exchanger 22. The temperature of the cooling medium is preferably, for example, about 350 to about 550 degrees centigrade in view of a cooling effect and a heat stress generated in an object to be cooled.

The rest of the carbon dioxide increased in pressure in the compressor 26 is discharged out of the system. The carbon dioxide discharged outside is recovered by a recovery device, for instance. Further, the carbon dioxide discharged outside is usable for EOR (Enhanced Oil Recovery) or the like used in a coal mining site, for instance. In the above-described system, carbon dioxide in an amount corresponding to a generation rate of the carbon dioxide generated by the combustion of the fuel and the oxygen in the combustor 20 is discharged out of the system, for instance.

Figure 2:
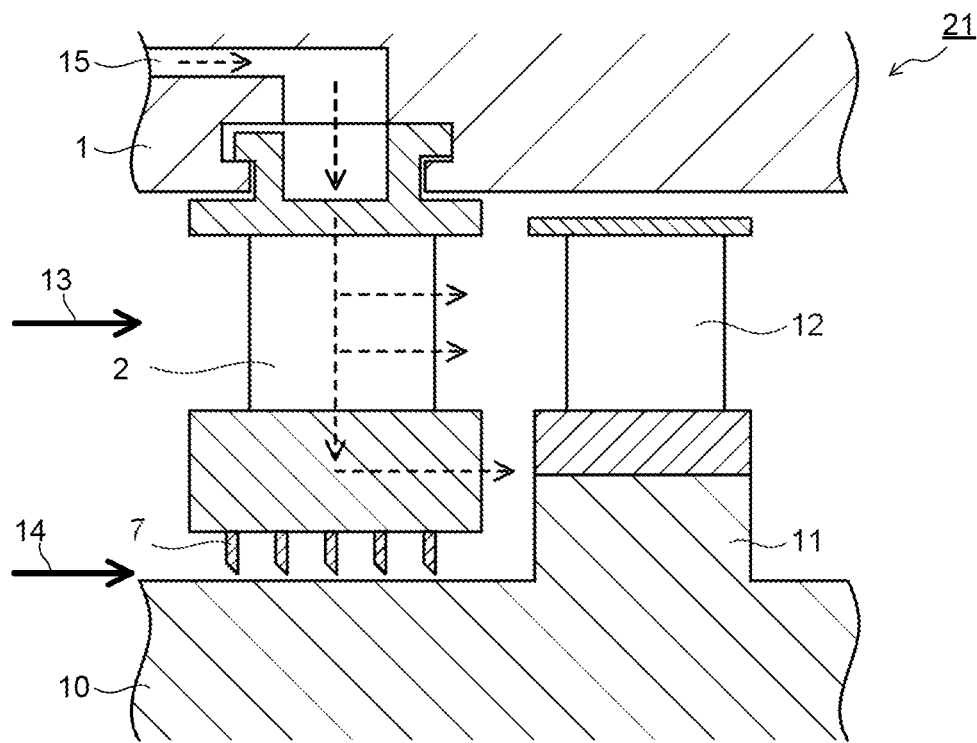
FIG. 2 is a view illustrating part of a cross section of the turbine including a turbine stator blade of a first embodiment.

Next, the structure of the turbine 21 including turbine stator blades 2 will be described. FIG. 2 is a view illustrating part of a vertical cross section along an axial direction of the turbine 21 including the turbine stator blades 2 of the embodiment. As illustrated in FIG. 2, the plural (FIG. 2 illustrates only one) turbine stator blades 2 are arranged along a circumferential direction on an inner side of a cylindrical casing 1 to constitute a stator blade cascade.

Right under the stator blade cascade, there is disposed a rotor blade cascade constituted by a plurality of (FIG. 2 illustrates only one) turbine rotor blades 12 planted in a rotor disk 11 of a turbine rotor 10 along the circumferential direction. The stator blade cascades and the rotor blade cascades are alternately arranged along the axial direction of the turbine rotor 10. A stator blade cascade and a next downstream rotor blade cascade constitute one turbine stage.

As described above, an annular combustion gas flow path having the stator blade cascades and the rotor blade cascades is formed on the inner side of the casing 1, and combustion gas 13 flows in this combustion gas flow path as indicated by an arrow in FIG. 2. Further, on an inner periphery side of the stator blade cascades, labyrinth fins 7 are disposed to minimize leakage gas 14 (indicated by the arrow in FIG. 2) flowing in a gap between a stationary part and a rotating part. Inside the casing 1 and the turbine stator blades 2, a coolant flow path 15 is formed, through which a coolant, for example, the carbon dioxide being the supercritical fluid flows, as indicated by the dotted arrows in the drawing, to cool the blade effective part 4 and so on of the turbine stator blades 2.

Figure 3:
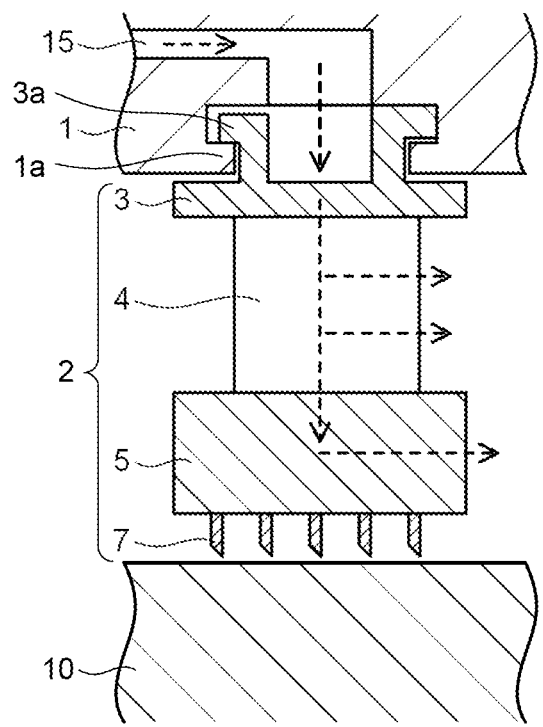
FIG. 3 is a view illustrating a cross section of the turbine stator blade of the first embodiment assembled in a casing.
Figure 4:
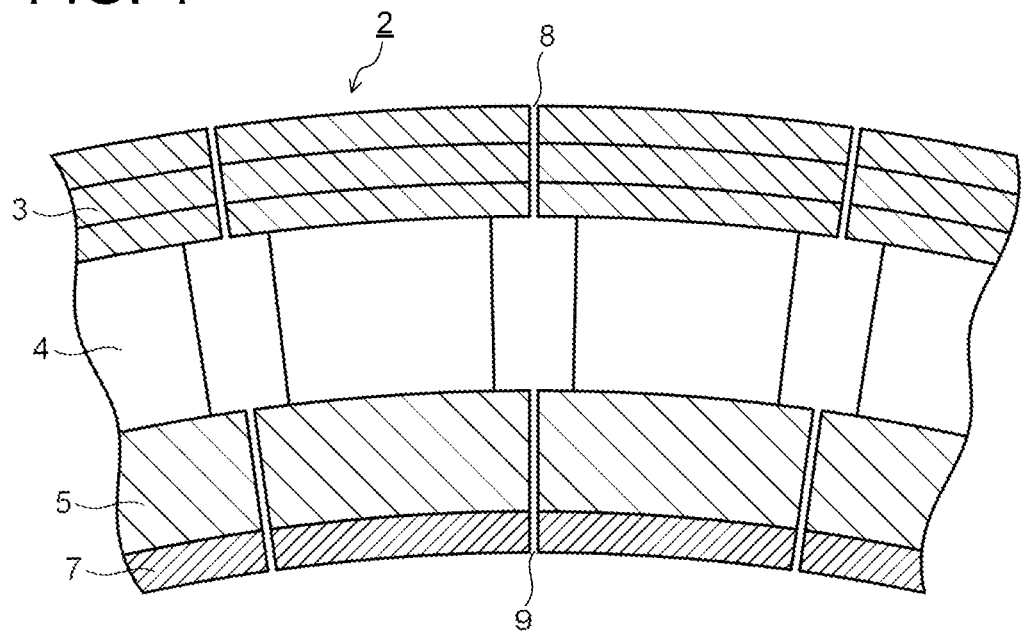
FIG. 4 is a view illustrating cross sections of the turbine stator blades of the first embodiment assembled in the casing.

Next, an assembled structure of the turbine stator blade 2 of the first embodiment will be described. FIG. 3 is a view illustrating a sectional structure of the turbine stator blade 2 of the first embodiment assembled in the casing, taken along the axial direction. FIG. 4 is a view illustrating a sectional structure of the turbine stator blades 2 of the first embodiment assembled in the casing, taken along the circumferential direction.

As illustrated in FIG. 3, the turbine stator blade 2 is installed on the inner side of the casing 1, with a hook 3a of an outer ring sidewall 3 of the turbine stator blade 2 being engaged with a hook 1a of the casing 1. The turbine stator blade 2 has the outer ring sidewall 3 along its outermost periphery. Further, it has the blade effective part 4 on an inner periphery of the outer ring sidewall 3, and has an inner ring sidewall 5 on an inner periphery of the blade effective part 4. It further has the labyrinth fins 7 on an inner periphery of the inner ring sidewall 5.

FIG. 4 illustrates states of the outer ring sidewalls 3 and the inner ring sidewalls 5 of the turbine stator blades 2 when the turbine 21 is not in operation. As illustrated in FIG. 4, there is a gap 8 between the outer ring sidewall 3 and the outer ring sidewall 3 of the adjacent blade (adjacent turbine stator blade 2). The purpose of the gap 8 is to prevent the outer ring sidewalls 3 from pushing each other due to a temperature difference between the casing 1 and the outer ring sidewalls 3 during the operation of the turbine 21 and a difference in coefficient of thermal expansion between the casing 1 and the outer ring sidewalls 3 ascribable to their material difference, when the outer ring sidewalls 3 thermally expand during operation. Similarly, when the turbine 21 is not in operation, there is a gap 9 between the inner ring sidewall 5 and the inner ring sidewall 5 of the adjacent blade. The gap 8 and the gap 9 may differ in dimension.

Figure 5:
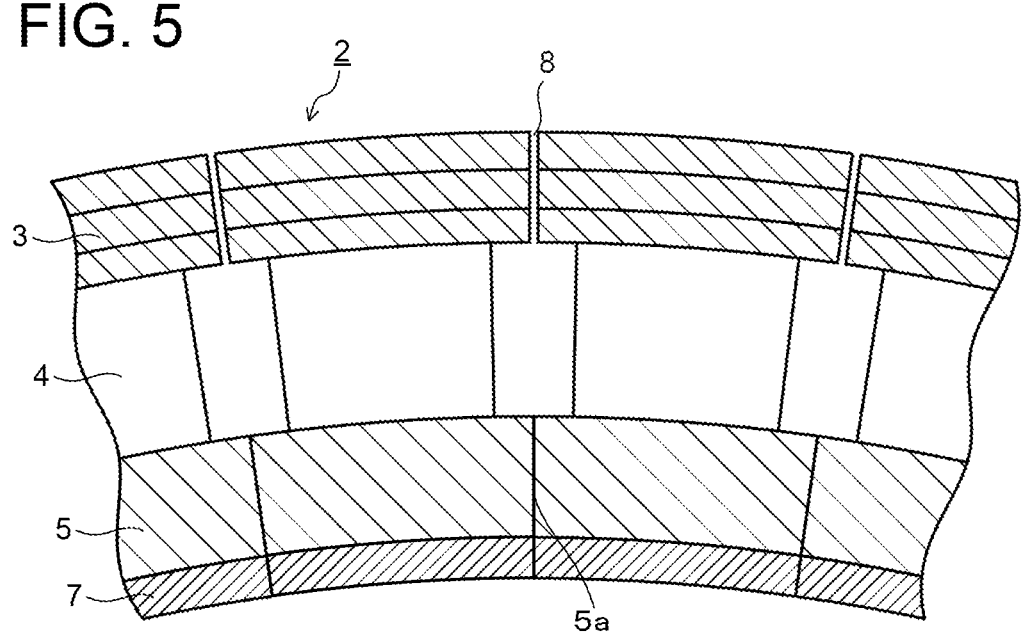
FIG. 5 is a view illustrating cross sections of the turbine stator blades of the first embodiment during operation.
Figure 6:
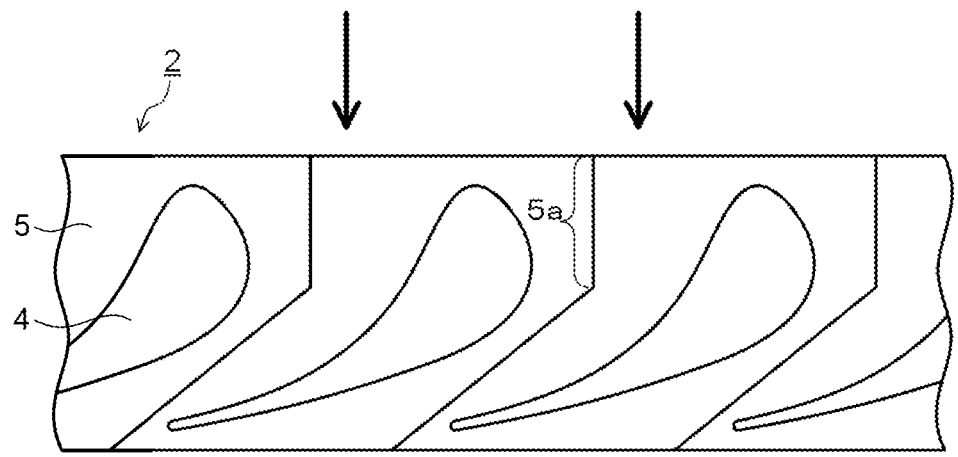
FIG. 6 is a view illustrating inner ring sidewalls of the turbine stator blades of the first embodiment during operation.

FIG. 5 illustrates states of the outer ring sidewalls 3 and the inner ring sidewalls 5 of the turbine stator blades 2 when the turbine 21 is in operation. FIG. 6 illustrates a state of the inner ring sidewalls 5 of the turbine stator blades 2 when the turbine 21 is in operation.

As illustrated in FIG. 5, when the turbine 21 is in operation, the outer ring sidewall 3 has the gap 8 from the outer ring sidewall 3 of the adjacent blade. The purpose of this is to prevent the outer ring sidewalls 3 from pushing each other when a difference in thermal expansion occurs between the casing 1 and the outer ring sidewalls 1 due to a temperature difference and so on between the casing 1 and the outer ring sidewalls 3 during the operation. On the other hand, the gap 9 is eliminated between the inner ring sidewalls 5 and they are in contact with each other due to a temperature difference between the casing 1 and the inner ring sidewalls 5 during the operation of the turbine 21 and their difference in coefficient of thermal expansion ascribable to their material difference. This contact state may occur due to the difference in coefficient of thermal expansion between the casing 1 and the inner ring sidewalls 5 and due to the deformation of the stator blades 2 by their allowable stress or less.

As illustrated in FIG. 6, when the turbine 21 is in operation, the inner ring sidewall 5 and the inner ring sidewall 5 of the adjacent blade are restricted by each other and thus can be small in torsional deformation even if they are independent without having a grouped blade structure or an integrated structure. The inner ring sidewall 5 has a contact face 5a along a flow direction of the working fluid (combustion gas) (axial direction of the turbine 21) indicated by the arrows in FIG. 6 at least at one place thereof. With the contact surface 5a being such, displacement of the contact faces 5a can be reduced, and the torsional deformation which occurs when the inner ring sidewall 5 is independent can be effectively reduced. Without the contact face 5a along the flow direction of the working fluid (axial direction of the turbine 21), even if the inner ring sidewalls 5 are in contact with each other, there is a possibility that their contact faces displace from each other, causing a possibility that the turbine stator blades 2 rotate and the effect of reducing the torsional deformation is reduced.

Incidentally, an end face of the inner ring sidewall 5 may be entirely in contact with the inner ring sidewall 5 of the adjacent blade, or only part thereof, for example, only the contact face 5a along the flow direction of the working fluid (axial direction of the turbine 21) may be in contact with the inner ring sidewall 5 of the adjacent blade.

Second Embodiment

Figure 7:
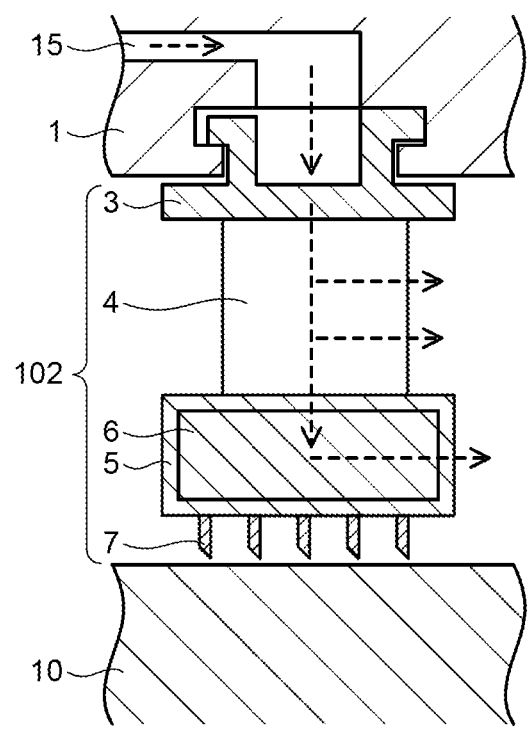
FIG. 7 is a view illustrating a cross section of a turbine stator blade of a second embodiment assembled in a casing.
Figure 8:
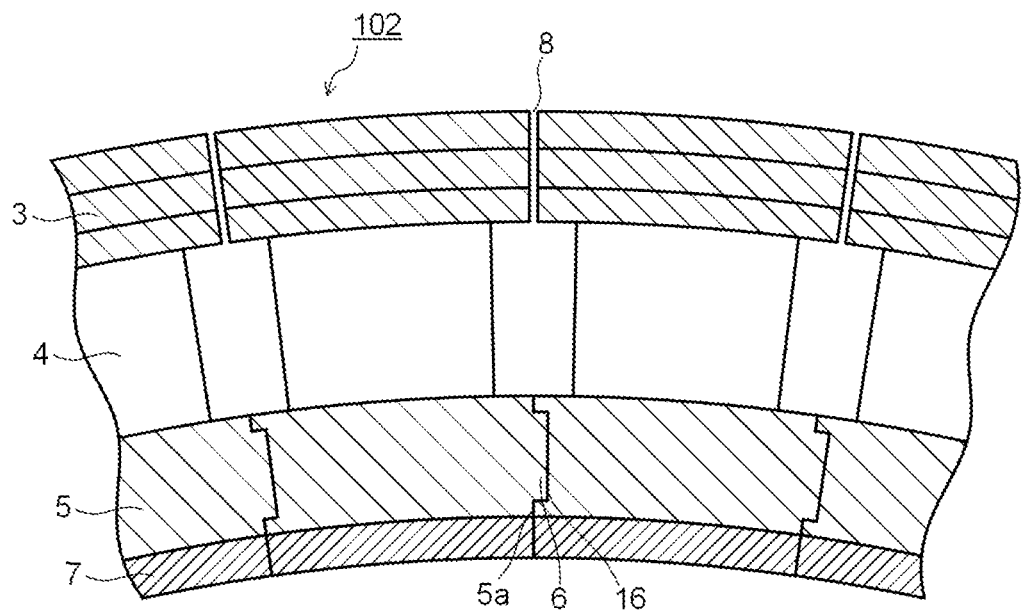
FIG. 8 is a view illustrating cross sections of the turbine stator blades of the second embodiment during operation.

Next, a second embodiment will be described. FIG. 7 is a view illustrating a sectional structure of a turbine stator blade 102 of the second embodiment assembled in a casing, taken along an axial direction. FIG. 8 is a view illustrating a sectional structure of the turbine stator blades 102 of the second embodiment assembled in the casing, taken along a circumferential direction. Note that, in FIGS. 7 and 8, parts corresponding to those of the turbine stator blade 2 illustrated in FIGS. 2 to 6 and so on are denoted by the same reference signs.

As illustrated in FIG. 2, in the casing 1, combustion gas 13 flows on an outer side of an inner ring sidewall 5 (a part corresponding to a blade effective part 4), and leakage gas 14 flows on an inner side of the inner ring sidewall 5. Mixing of the leakage gas 14 having a low velocity into the combustion gas 13 accelerated by a nozzle is one cause to decrease thermal efficiency.

So, in the turbine stator blade 102 of the second embodiment, as illustrated in FIG. 7, the inner ring sidewall 5 has a seal plate (protrusion) 6 at its position in contact with the inner ring sidewall 5 of the adjacent blade. As illustrated in FIG. 8, the seal plate 6 protrudes from the inner ring sidewall 5 toward the inner ring sidewall 5 of the adjacent blade. The inner ring sidewall 5 of the adjacent blade has a recess 16 having a shape fitting the shape of the seal plate 6 and facing the seal plate 6. When a turbine 21 is in operation, contact faces 5a along a flow direction of the working fluid (axial direction of the turbine 21) are in contact with each other as in the first embodiment. In addition, the seal plate 6 is fit in the recess 16 to close a flow path from which the leakage gas 14 flows into the combustion gas 13 to prevent the leakage gas 14 from mixing into the combustion gas 13.

Third Embodiment

Figure 9:
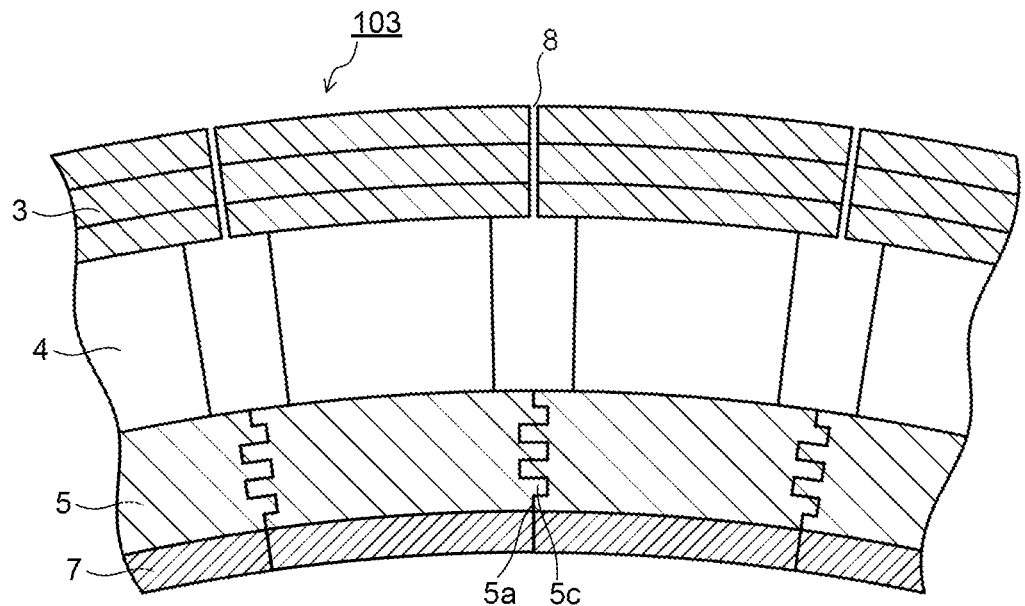
FIG. 9 is a view illustrating cross sections of turbine stator blades of a third embodiment during operation.

Next, a third embodiment will be described. FIG. 9 is a view illustrating a sectional structure of turbine stator blades 103 of a third embodiment assembled in a casing, taken along a circumferential direction. Note that, in FIG. 9, parts corresponding to those of the turbine stator blade 2 illustrated in FIGS. 2 to 6 and so on are denoted by the same reference signs. As illustrated in FIG. 9, in the turbine stator blade 103, an inner ring sidewall 5 has an uneven part 5c having a plurality of protrusions and a plurality of recesses. When the turbine 21 is in operation, contact faces 5a along a flow direction of a working fluid (axial direction of a turbine 21) are in contact with each other as in the first embodiment. Accordingly, the uneven part 5c fits into the uneven part 5c of the adjacent blade to close a flow path from which leakage gas 14 flows into combustion gas 13 to prevent the leakage gas 14 from mixing into the combustion gas 13.

Fourth Embodiment

Figure 10:
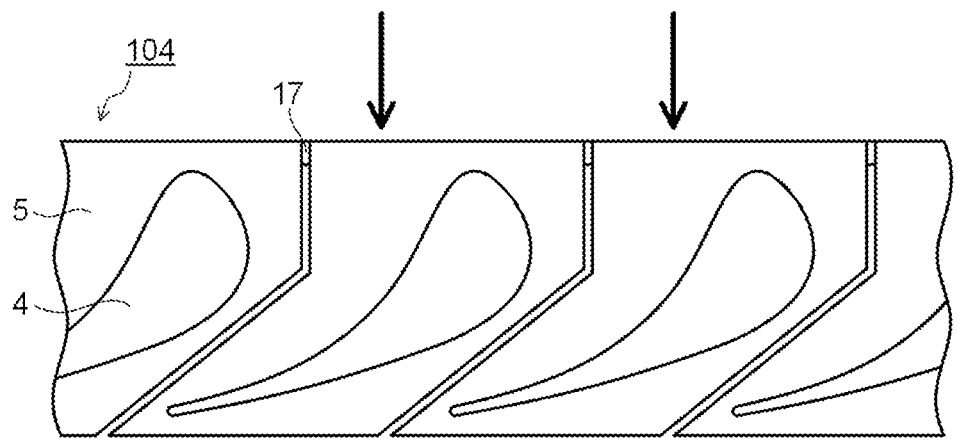
FIG. 10 is a view illustrating inner ring sidewalls of turbine stator blades of a fourth embodiment during operation.
Figure 11:
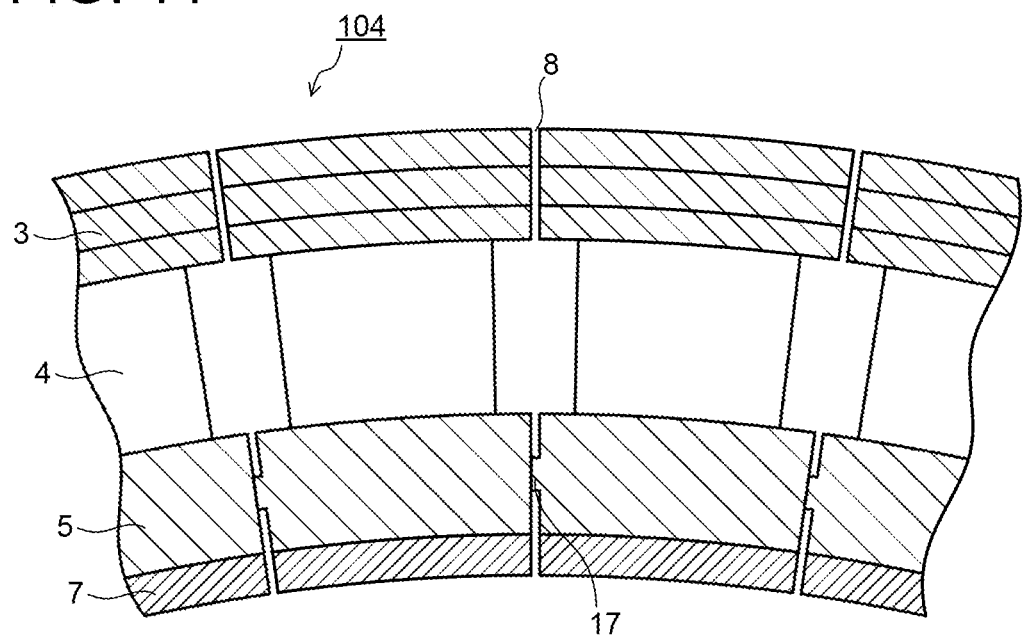
FIG. 11 is a view illustrating a cross section of the turbine stator blades of the fourth embodiment during operation.

Next, a fourth embodiment will be described. FIG. 10 illustrates a state of inner ring sidewalls 5 of turbine stator blades 104 when a turbine 21 is in operation. FIG. 11 is a view illustrating a sectional structure of the turbine stator blades 104 of the fourth embodiment assembled in a casing, taken along a circumferential direction. Note that, in FIGS. 10 and 11, parts corresponding to those of the turbine stator blade 2 illustrated in FIGS. 2 to 6 and so on are denoted by the same reference signs.

As previously described, in the turbine stator blade 2 of the first embodiment, the inner ring sidewall 5 has the gap 9 from the inner ring sidewall 5 of the adjacent blade when the turbine 21 is not in operation. Then, when the turbine 21 is in operation, the inner ring sidewall 5 comes into contact with the inner ring sidewall 5 of the adjacent blade. This necessitates precisely adjusting the gap between end faces of the inner ring sidewalls 5 in the assembled state. A material of turbine stator blades of a gas turbine is typically a hard-to-cut material formed of a Co-base or Ni base superalloy, and accordingly, its cutting or the like by machining takes time.

In the turbine stator blade 104 of the fourth embodiment, as illustrated in FIG. 10 and FIG. 11, the inner ring sidewall 5 has, on its end face, a protrusion 17 protruding toward the inner ring sidewall 5 of the adjacent blade, and when the turbine 21 is in operation, only an end part of the protrusion 17 comes into contact with the adjacent inner ring sidewall 5. Note that the end part of the protrusion 17 and a contact face of the inner ring sidewall 5 of the adjacent blade are contact faces along a flow direction of a working fluid (combustion gas) (axial direction of the turbine 21) indicated by the arrows in FIG. 10.

In this case, as illustrated in FIG. 10 and FIG. 11, when the turbine 21 is in operation, the inner ring sidewall 5 except the protrusion 17 is not in contact with the inner ring sidewall 5 of the adjacent blade, and there is a gap therebetween. Accordingly, a part whose gap requires the precise adjustment is only the contact face of the protrusion 17. This can reduce the area of a place whose gap is subjected to the adjustment by cutting or the like by machining, making it possible to shorten the time required for the adjustment. Note that, on a part that is not in contact with and has a gap from the inner ring sidewall 5 of the adjacent blade when the turbine 21 is in operation, the aforesaid seal plate 6, the recess 16, or the like may be provided to prevent the leakage gas 14 from mixing into the combustion gas 13.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A turbine comprising:
    a cylindrical casing; and
    a plurality of turbine stator blades arranged in the casing along a circumferential direction, the turbine stator blades each including:
        a blade effective part;
        a coolant flow path through which a coolant flows in the blade effective part to cool the blade effective part;
        an outer ring sidewall provided on an outer periphery of the blade effective part; and
        an inner ring sidewall provided on an inner periphery of the blade effective part; and
    at least one contact part being provided at an end part of the inner ring sidewall with at least part thereof being disposed along a flow direction of a working fluid, the at least one contact part coming into contact with the inner ring sidewall of the adjacent blade during operation, and separating from the inner ring sidewall of the adjacent blade when the operation is stopped, wherein
    a gap is formed between mutually facing end parts of the outer ring sidewalls that prevents the outer ring sidewalls from contacting and pushing each other, during operation and when the operation is stopped.

2. The turbine according to claim 1, wherein the at least one contact part each includes at least one protrusion protruding toward the inner ring sidewall of the adjacent blade.

3. The turbine according to claim 2, wherein the at least one contact part each includes:
    at least one recess which is disposed in an end part of the inner ring sidewall so as to face the protrusion of the adjacent blade and in which the protrusion is fit when the contact parts come into contact with each other during the operation.

4. The turbine according to claim 1, wherein the at least one contact part each includes:
    a plurality of protrusions protruding toward the inner ring sidewall of the adjacent blade, and
    a plurality of recesses which are disposed in an end part of the inner ring sidewall so as to face the protrusions of the adjacent blade and in which the protrusions are fit when the contact parts come into contact with each other during the operation.

5. The turbine according to claim 1, wherein the turbine stator blades each includes at least one labyrinth fin provided on an inner periphery of the inner ring sidewall.

* * * * *